April 25, 1933.  J. BIJUR  1,905,335
CHASSIS LUBRICATING INSTALLATION AND THE FLOW CONTROL ELEMENTS THEREOF
Original Filed Aug. 9, 1922   2 Sheets-Sheet 1
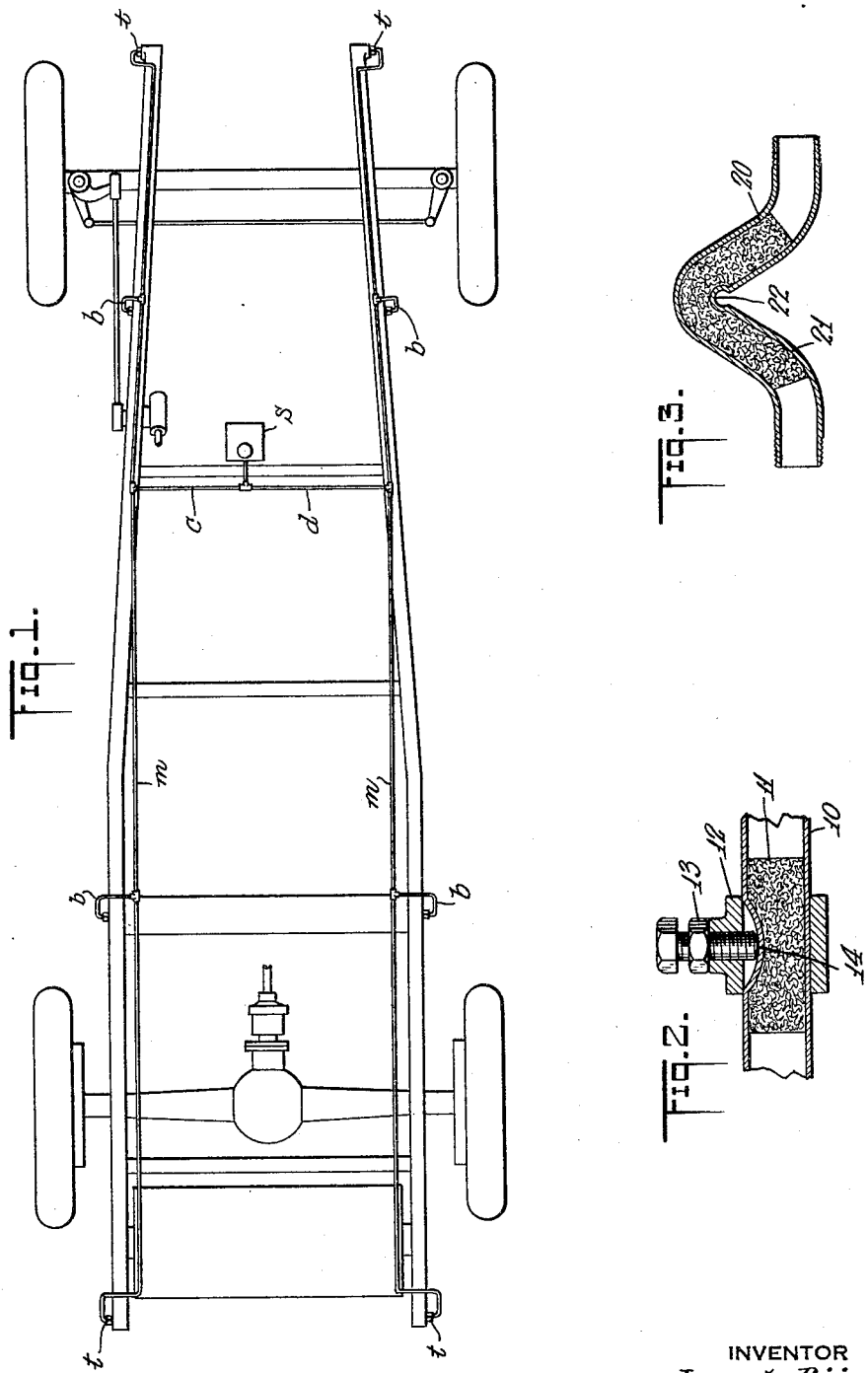
INVENTOR
Joseph Bijur
BY
his ATTORNEYS.

April 25, 1933.  J. BIJUR  1,905,335
CHASSIS LUBRICATING INSTALLATION AND THE FLOW CONTROL ELEMENTS THEREOF
Original Filed Aug. 9, 1922  2 Sheets-Sheet 2
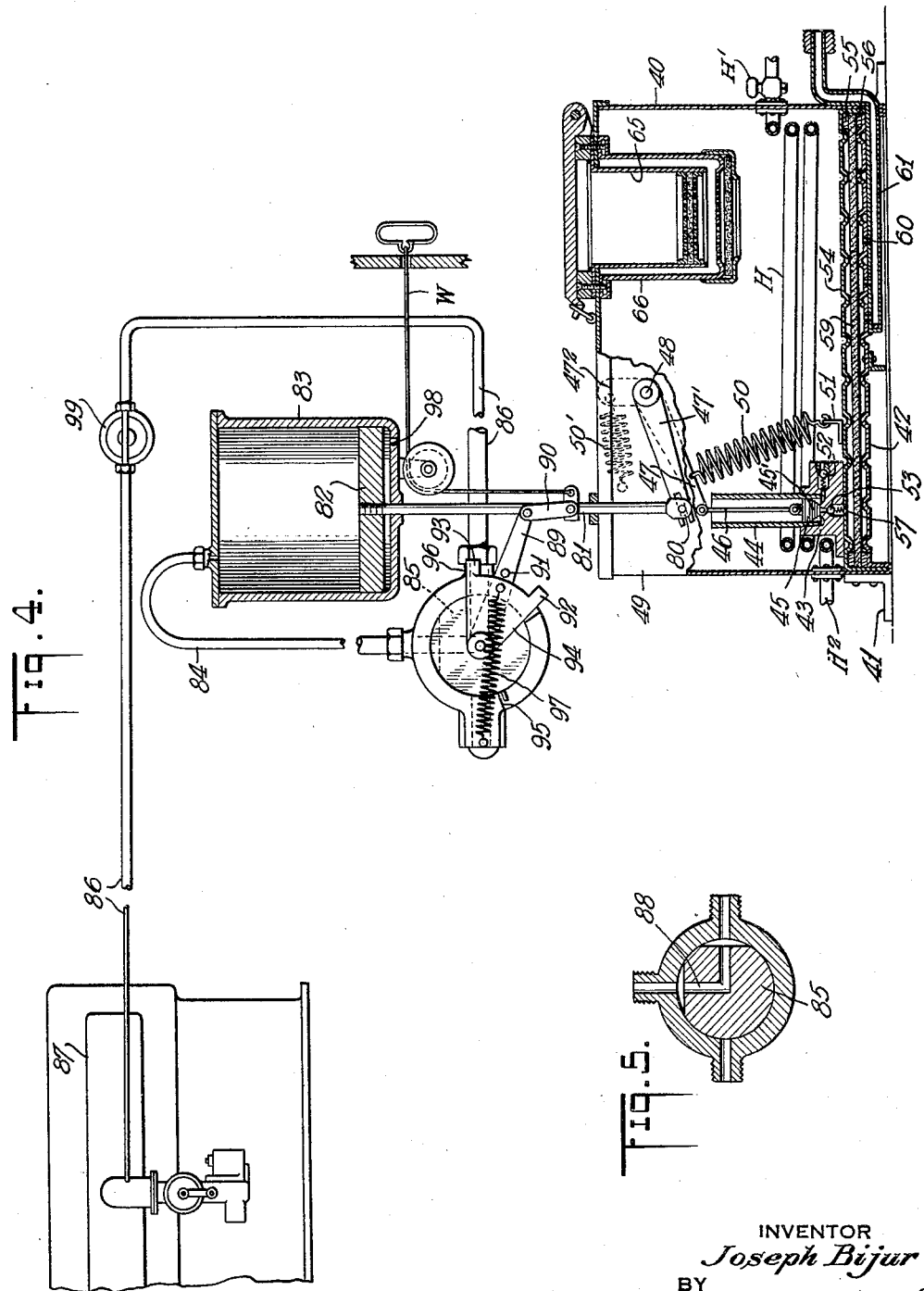

Patented Apr. 25, 1933

1,905,335

UNITED STATES PATENT OFFICE

JOSEPH BIJUR, OF NEW YORK, N. Y., ASSIGNOR TO AUTO RESEARCH CORPORATION, A CORPORATION OF DELAWARE

CHASSIS LUBRICATING INSTALLATION AND THE FLOW CONTROL ELEMENTS THEREOF

Original application filed August 9, 1922, Serial No. 580,668. Divided and this application filed January 7, 1929. Serial No. 330,720.

My present invention relates to remote-control lubrication and is concerned primarily with systems, methods, installations and the constituent elements thereof for lubricating one or more bearings on a machine or group of machines from a readily accessible point of control. The invention has its preferred application to the lubrication of all or most of the bearings on the chassis of a vehicle such as an automobile or a motor truck.

An object of the invention is to provide a simple and reliable installation upon a machine, more particularly a motor vehicle, operable substantially without effort or attention, for satisfactorily lubricating all or a substantial number of the bearings thereof from a central station thereon.

Another object is to provide a lubricating system, the flow control fittings of which are readily suited for emitting under pressure at the diverse rates proper for different bearings supplied from a common source, and in which each flow control fitting comprises a minimum number of parts of stock readily available on the market and easily assembled with a minimum of effort.

Another object is to provide an installation of the type referred to in which the troublesome operation of cleaning fittings and the like, to maintain the system in operation is eliminated.

In a preferred apparatus for carrying out the above and other objects, the lubricating oil is forced through metal pipes of small bore to the bearings in parallel by pressure applied at one point of control. In the path of flow to each bearing and in the vicinity thereof, there is interposed a pressure-absorbing resistance or obstructing body which I call a seepage resistance or obstruction. The term "seepage resistance" is intended to embrace broadly any obstruction in the line of flow, operating to permit only slow, preferably drop by drop passage of the fluid therebeyond when pressure is applied thereto. The seepage resistance offers an obstruction to the flow of liquid, greater than the frictional resistance encountered in the bearings or in the length of the pipes, so that it is a determining factor in the flow to each bearing, substantially regardless of the tightness or looseness of the bearings or of the length or resistance of the line.

The seepage resistance or obstruction is preferably located in the interior of the pipe or pipe fitting. It may be made of tightly packed fibrous or other porous material resisting flow to absorb the pressure. In a desirable type of seepage resistance, preferred in many applications, the oil is forced through a plug or porous material, such as felt or an elongated felt wick closely packed into the pipe bore.

During the application of pressure to the line, oil will be fed slowly to all bearings at a rate determined largely by the seepage resistance through which it is forced on its way to the bearing, by the applied pressure.

It is preferred to provide special means for intercepting solid particles before they can reach the seepage restrictions. This means may include a fine filter guarding the entrance to the distributing system. In the system involving the seepage obstructions of high resistance, referred to, where the flow of lubricant is extremely slow, it is feasible and desirable to provide adjacent the source of pressure and preferably as a part thereof, a filter of substantial area through which the lubricant is forced to the conduit system on its way to the bearings.

The pressure may be exerted upon the lubricant by the spring returned piston of a pump, first charged either by a manual or a manually-controlled operation, or automatically operated for continuous discharge throughout vehicle operation, the resistance of the seepage obstructions in the line serving greatly to retard the otherwise rapidly executed operative pump stroke, for feed of the oil, drop by drop, at each bearing at a rate preferably in the order of a few drops per minute, in the manually operated embodiment, and at equivalent rate in the continuous automatic embodiment.

For continuous automatic lubrication without need for any special manual operations, the lubricant propulsive agency may be energized automatically in the usual operation of the machine or of a control element thereof. In one desirable embodiment, the pump after it has been discharged to a predetermined extent, is automatically connected to an operative part of the engine, for instance, for application of the suction in the intake manifold, which supplies the force to recharge it and is then automatically disconnected from the pump to allow the latter slowly to feed the lubricant to the bearings.

When the source of lubricant is at level higher than that of some or all of the seepage fittings, means is preferably provided adjacent the source of pressure to exclude atmospheric air during the periods of rest of the engine, thereby to hinder drip or leak from the valveless distributing system.

The pressure source is mounted at a convenient place as for instance on the chassis frame, and the main conduits extend along the sides of the frame and have taps each provided with a seepage fitting or restriction from which the various parts connected to the frame, such as the spring shackles and the steering gear are supplied in parallel with lubricant, said piping having, moreover, one or more yielding branches or taps also provided with seepage fittings or restrictions and extending to the bearings on the unsprung part or axles, for instance, to the king pin, the tie rod clevises and the brake linkage, and to other parts movable with respect to the frame.

By reason of the extremely slow rate of flow of the lubricant through the mains, the drop of pressure therein is substantially negligible, so that substantially the same oil pressure will be applied to restrictions remote from the pump as to those nearest thereto. It is, therefore, feasible to set or select the seepage fittings permanently and nonadjustably for a definite rate of flow.

In the preferred embodiment, the entire length of the conduit is of seamless metal pipe, and of internal diameter preferably in the neighborhood of one-eighth inch. Accordingly said pipes including the bridging portions thereof that may extend unsupported between their ends from the frame to the unsprung carrying elements are oil-tight, said portions being, of course, of sufficient length to flex with the relative movements of axles and frame, without undue strain thereon.

As the viscosity of lubricating oil increases rapidly as its temperature is lowered, particularly in the range below the freezing point of water, I may employ a thinner lubricant in the winter, or provide special means to expedite lubrication in cold weather, with a grade of oil suitable in summer. This, I accomplish by heating the oil within the reservoir in winter as through a tap from the exhaust or from the water jacket, or by locating the reservoir in a region warmed directly or indirectly by the engine, or by applying additional spring tension to the pump to exert increased pressure upon the lubricant, or by two or more of these methods combined.

This application is a division of my copending application Serial No. 580,668 filed August 9th, 1922.

In the accompanying drawings in which are shown one or more of various possible embodiments of the several features of the invention, Fig. 1 is a diagrammatic view indicating a chassis lubricating installation, Fig. 2 is a view in longitudinal section of one embodiment of seepage fitting for the system disclosed, Fig. 3 is a view similar to Fig. 2 of another embodiment of seepage fitting, Fig. 4 is a detail view indicating an automatic lubricant supply therefor, in vertical cross-section, and Fig. 5 is a detailed sectional view of the control valve therefor.

Referring now to the drawings, there is shown diagrammatically the general layout of the chassis of an automobile having a lubricant supply unit S, illustratively on the dashboard. The distributing system includes headers c and d, which communicate at their ends with the respective mains m extending the length of the channel frames and feeding various bearings t at their ends. The mains also have branches b leading to various other bearings connected to the frame, such as those of the shackles and spring bolts. Bridging conduits (not shown) are provided, leading to the corresponding bearings on the unsprung parts of the vehicle.

In each of the outlet lengths or branches of the mains m seepage resistances are provided. These resistances are composed of fillers within the lengths of the outlet or branch sections and two embodiments thereof are separately shown in Figs. 2 and 3. The lubricant supply unit S is preferably associated with the engine to exert continuous discharge pressure while the engine is running. A specific embodiment of the supply unit is shown in Fig. 4. The seepage devices of Figs. 2 and 3 while not affording the delicacy of compression and adjustment inherent in certain of the other fittings described in the parent application, are useful where extreme cheapness is of greater importance than refinement.

In Fig. 2 is shown a tube of copper 10 containing a porous plug 11 of felt, steel wool or similar porous material surrounded by a clamp 12, the screw element 13 of which presses inward against the tube to adjustably compress the latter as at 14 and with it the seepage mass contained therein. The pipe preferably is indented as at 14 to firmly anchor the seepage mass 11 therein in assembly, to retain it against moving lengthwise of the pipe.

The embodiment of Fig. 3 comprises a copper tube 20 containing a wick 21 of felt or equivalent highly compacted porous material, the tube being bent into a V substantially centrally of the wick, the fold 22 formed in the tube by the relatively sharp bend at the inner side effecting a compression of the adjacent portion of the felt to correspondingly restrict the flow. The sharpness of the bend may be readily adjusted to increase or decrease the compression and correspondingly to regulate the flow.

The fittings of Figs. 2 and 3 may be applied by appropriate connections (not shown) the pipe fitting 20 being illustratively shown threaded at its ends to apply the latter in the various pipe branches or outlet lengths leading to the respective bearings. Each fitting is set to feed at approximately the rate suiting the requirements of the corresponding bearing.

The resistance of each seepage fitting is so high compared to the combined resistance of the conduits and of the bearings that said seepage fitting resistance practically alone determines the rate of flow to the bearing, the magnitude of any drop of pressure in even the longest line being small compared to the drop in the seepage fitting. It will thus be seen that reasonably accurate distribution of oil to the bearings is effected throughout the period of operation of the pressure source S substantially regardless of the length of frictional resistance in the piping, or of the tightness or looseness of the bearings.

Since the details of the instrumentality for applying continuous pressure to the distributing system are not material to the invention claimed herein, I will describe but briefly the construction shown in Figs. 4 and 5, referring to the parent application and to the Patent No. 1,746,139, issued February 4, 1930, on a division of said parent application.

The pump unit may comprise a sheet metal box or reservoir 40 having lugs 41 by which it can be secured in any desired place upon the vehicle, preferably in front of the dashboard. Upon the bottom 42 is secured the pump which comprises a base casting 43 within the upper end of which is threaded an open-ended upstanding cylinder 44. The piston 45 is joined by a connecting rod 46 to a lever 47 mounted upon a rock shaft 48 extending through the side wall 49 of the casing, preferably at an elevation higher than that of the lubricant within the reservoir, to dispense with the need for packing. The pump actuating means to be hereinafter described, is operatively connected to a lever 47' on the projecting end of rock shaft 48.

A coil spring 50 connects the lever 47 to a metal angle strip 51 extending across the bottom 42, thereby normally maintaining the piston at the bottom of its stroke, with its lower leather covered end 45' sealing the outlet. The pump base has a spring-pressed ball check valve 52 in the side, past which the oil is sucked by the raising of the piston and a similar spring-pressed relief valve 53 opens upon the downward stroke of the piston for ejection of the lubricant therethrough.

To avoid possible clogging of the restriction fittings of Figs. 2 and 3 by minute solid particles carried with the oil, a relatively dense filter, preferably of sole or similar heavy leather is embodied in the reservoir. The dense filter 59 is preferably interposed in the path of oil flow between the pump and the pipe line and offers such high resistance to flow, that the oil is urged therethrough at an extremely slow rate, which is feasible and consistent with the operation of the system, where the oil is to ooze slowly past the restriction fittings.

In a preferred embodiment, the dense filter is of large area preferably equal to that of the reservoir bottom and is clamped against said bottom 42 by an auxiliary flanged clamping plate 54.

The lubricant from the filter is fed to the headers c and d through a pipe 61, communication from the filter head to said pipe being established through a series of registering apertures 60 through the bottom 42 and the upper surface of pipe 61.

A removable strainer filler cup 65, within a filter cup 66 protects the filter 59 from becoming clogged, should dirty oil be poured into the reservoir.

If the same grade of oil were used in my system winter and summer, it will be obvious that by reason of the much greater viscosity of the oil at low temperatures, the feed of lubricant to the bearings may be greatly retarded, particularly at the dense filter 59 and at the various restrictions. I compensate for this by mounting the reservoir and pump as shown, in the vicinity of the engine, so that the supply of oil therein, will be maintained warm winter and summer, as long as the engine is running, whereby regardless of the season or latitude, oil of substantially uniform viscosity would be forced through the dense filter 59.

Furthermore, it is desirable in many cases to provide a heating coil within the reservoir 40 and extending as shown, about the inner walls thereof and communicating preferably with the exhaust, or, if desired, with the water jacket, so that warm gases or water supplied therethrough will maintain the oil in the reservoir warm. Preferably a cock H' is provided adjacent the inlet to the coil H to shut off the supply of heated fluid in warm weather. The inclination of the turns of the heating coil is preferably such that any water condensed in the exhaust will readily flow out by gravity through the delivery or drain opening $H^2$.

In addition to or in lieu of the temperature compensating heating coil described, I may provide an auxiliary coil spring 50' attached at one end to a lever arm 47² affixed upon the protruding end of rock shaft 48. The free end of spring 50' may be anchored to a hook (not shown) to provide additional spring pressure in winter for forcing the pump piston 45 downward to compensate for the increased viscosity of the oil.

Automatic charging of the pump is effected by utilizing power generated in the operation of the engine. The intake suction, the exhaust pressure or the compressed charge within a cylinder, illustratively may be utilized for this purpose. Each time that the pump plunger has executed an effective discharge stroke, it is automatically connected to return it to the top of the stroke, for again charging the pump and continuing the lubrication.

Referring to the drawings, which show a preferred intake-manifold vacuum-operated embodiment, the lever 47' rigidly connected to the exposed end of rock shaft 48, is associated by a pin and slot connection 80 with the lower end of the plunger 81 of a piston head 82, sliding up and down in the cylinder 83 of a vacuum pump above the reservoir. The top of cylinder 83 is closed tight and from it a pipe 84 extends to the automatic valve 85, and thence by way of pipe 86 to the intake manifold 87. The automatic valve has an L-shaped port 88, which in one position, connects the vacuum power cylinder 83 with the intake manifold and in the other to atmosphere. A lever 89 linked as at 90 to the stem 81 of the pump plunger is pivoted on the axis of the valve 85. The lever is provided with a pin 91 to strike stop 92 when moved clockwise and stop 93 when moved counterclockwise. Both stops are on a quadrant 94 fixed to the valve 85 to snap the valve against stop 95 and stop 96 respectively on the valve casing, by the action of a coil spring 97 which connects the quadrant and the valve to the valve casing and functions when shifted past the axis of the valve. In the position shown, the plunger is down and lever 89 has shifted spring 97 past the axis to snap the valve 85 against stop 95 to establish the valve connection from the intake manifold to the power cylinder 83. Suction is thus applied to the power cylinder above piston 82, which is thereby elevated, air being admitted through vent hole 98 provided for this purpose, in the bottom of the power cylinder. When the power piston head reaches the top of its stroke, the lever 89 linked to the stem has reached a position where the pin 91 thereon presses against the stop 93 of the quadrant on the valve and throws it over dead-center, so that the spring snaps it to its upper position against stop 96, cutting off the vacuum and admitting atmospheric pressure to the top of the piston head through passage 84, whereupon the spring in the pump slowly returns the piston 82 to lowermost position in forcing lubricant slowly through the drip plugs to the bearings.

A wire $w$ connected to the plunger 81 has a hand ring, accessible from the front of the dashboard, affording auxiliary means to charge the pump by hand.

A hand-operated control valve 99 of conventional form may be provided in the pipe connection 86 from the intake manifold to the automatic valve 85, to place the system out of operation, if desired.

The apparatus described is particularly suitable though not limited to the lubrication of vehicles where continuous or non-manual lubrication is desirable, since, as above described, it substantially assures a continuous slow lubrication of all chassis bearings, while the vehicle is running, the pump being immediately re-charged automatically as soon as it is discharged.

By my arrangement of filter, I effectively guard against the admission into the system of any but clean oil even though the reservoir be charged with dirty oil. The rate of flow in each length of pipe depends merely upon the seepage resistances and the applied pressure, for oil of given viscosity. Increase of pressure increases the rate of flow at all the bearings; increase of seepage resistance, at any bearing decreases the rate of flow thereto, without affecting the flow to the other bearings. Thus, by simply selecting or setting each seepage obstruction to the desired resistance, the percentage of the total pump charge delivered therethrough can be readily adjusted. The resistance of each of the seepage fittings remains substantially constant even after prolonged use because the lubricant is freshly filtered on its way thereto.

The seepage resistances impeding the flow to an extent compared to which the frictional resistance of the pipe and of the bearings is small and the rate of flow being exceedingly slow, there is no considerable drop of pressure in the line, and the pressure per unit area is substantially the same at a seepage resistance remote from the pump as at one adjacent thereto. The system being thus essentially equi-potential at all points on the line, additional outlets or seepage resistances may be applied wherever required in the line, without other change and without in any way impairing the efficacy of the system.

Though the seepage fittings are devoid of valves or non-return elements, yet the pipe system will not become drained while the vehicle is idle. Valve 53 seals the head of the distributing system and precludes venting thereat, and the difference in level between the seepage fittings does not afford sufficient head for escape of oil past the highly resistant seepage fittings.

The present application is directed to drip plugs with porous capillary filler members and specifically to compressible porous capillary drip plugs. Rigid porous capillary filler members and adjustable drip plugs, including means to regulate the compression upon a block or wad of a porous capillary filler member are specifically described in my parent application Serial No. 580,668.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a central distributing installation of the type comprising a source of liquid, and a conduit system supplied therefrom having an inlet; the combination therewith of a plurality of outlet branches connected in multiple thereto, each of said branches having a permeable flow obstructing filler retained therein and of substantial length compared to the bore of the pipe and each of said fillers, preventing substantial gravity flow through the system, being of resistance so high compared to the resistance of the conduit system that it will itself determine the proportionate rate of flow through the outlet branch, and being securely clamped in a conduit element positioned closely adjacent to the bearing and forming part of said branch.

2. In a central distributing installation of the type comprising a source of liquid, and of propulsive pressure, and a conduit system supplied therefrom having an inlet; the combination therewith of a plurality of outlet branches connected in multiple thereto, each of said branches having an elongated permeable flow resistant filler frictionally engaged by the wall of the branch, and of flexibility to adapt it to be flexed with the branch, each of said fillers being of resistance so high compared to the resistance of the conduit system that it will itself determine the proportionate rate of flow through the outlet branch.

3. In an installation of the class described, the combination of pressure propulsive means, and a distributing system connected thereto; the combination therewith of a plurality of outlet branches in parallel and a flow impeding element in the form of a very dense, porous filler tightly fitted in each of said outlet branches, each of said fillers preventing substantial gravity flow through the system, being of resistance so high compared to the resistance of the system as to in itself determine the proportionate rate of flow through the branch, and being securely clamped in a conduit element positioned closely adjacent to the bearing and forming part of said branch.

4. In a central chassis lubricating installation for lubricating bearings of the type including a pipe line having an inlet closed against venting; the combination therewith of branches of flexible material with outlets feeding the bearings and connected in multiple thereto, and flexible capillary fillers in the bores of the respective branches, said fillers being of high resistance to the flow of lubricant under pressure and each filler being of flow obstructing effect to proportion the flow of lubricant according to the lubricant requirements of the corresponding bearing or bearings.

5. In a central chassis lubricating installation for lubricating bearings of the type including a pipe line, a source of pressure connected to the inlet of the piping system, and means closing said inlet against venting; the combination therewith of flexible outlet branches connected in multiple to said pipe line and leading to the respective bearings to be supplied therefrom, elongated flexible capillary flow restrictions within the lengths of the respective branches, in frictional engagement with the bores of the respective branches and adapted to resist emission for slow sustained flow to the bearings under the applied pressure, said flow restrictions having diverse flow resistances in accordance with the lubricant requirements of the bearings.

6. A chassis lubricating installation for lubricating bearings including a source of lubricant, a distributing conduit supplied therefrom, having flexible outlet branches leading to the respective bearings, tightly compacted permeable flow controlling and restricting filler members fitted in said branches and filter means in the system in advance of said compacted fillers to protect the latter.

7. A chassis lubricating installation for lubricating bearings including a source of lubricant, a distributing conduit system supplied therefrom having bendable outlet branches leading to the respective bearings, elongated wicks tightly fitted in the respective branches, each imposing a resistance to flow co-ordinated with the lubricant requirements of the corresponding bearings, means actuated by energy derived from the engine to propel lubricant under pressure into the head of the distributing system for emission through the wicks, and highly resistant, pressure absorbing filter means in the system between the pressure source and said wicks to protect the latter.

8. A flow restriction fitting for a central lubricating system with a branched piping arrangement comprising a conduit length, an elongated cylindrically porous filler tightly clamped within the bore thereof and terminal connections for said conduit length, said conduit length having a bore not substantially less than the bore of said piping arrangement, and said filler being so tightly retained therein adjacent its sides that no lubricant may by-pass through the length around the sides of the filler and that all lubricant must pass through the middle portion of said filler, said fitting including threaded means for effecting said clamping.

9. A flow restriction fitting for a central lubricating system with a branched piping arrangement comprising a conduit length, a cylindrical porous elongated filler tightly retained within the bore thereof, and terminal connections for said conduit length, said conduit length having a bore not substantially less than the bore of said piping arrangement, and said filler being so tightly clamped therein adjacent its sides that no lubricant may by-pass through the length around the sides of the filler and that all lubricant must pass through the middle portion of said filler, said terminal connections including threaded end portions on said length.

10. A flow restriction fitting for a central lubricating system comprising a feed pipe length, an elongated wick tightly fitted therein and means indenting said pipe and obstructing the wick from longitudinal movement therealong.

11. A restriction pipe fitting comprising a flexible pipe length having an elongated restriction fitting therein, a clamp encircling said pipe and a set screw through said clamp indenting said pipe and the contained restriction fitting.

12. A flow restriction fitting for a central lubricating system comprising a conduit length, an elongated compacted permeable restricting filler tightly retained within the bore thereof, and terminal connections for said conduit length, said filler being of resistance so high that it will in itself determine the proportionate flow to the bearing to which it is connected.

13. A flow restriction arrangement for a central lubricating system, comprising a conduit length, an elongated compact permeable restricting filler tightly retained in the bore thereof, and terminal connections for said conduit length, the compactness of said restricting filler being at a maximum adjacent its central portion and decreasing toward its extremities.

14. A flow restriction device for a central lubricating system, comprising a conduit length, an elongated compact restricting felt filler, tightly retained within the bore thereof, and terminal connections for said conduit length, said filler being of resistance so high that it will in itself determine the proportionate flow of the bearing to which it is connected.

15. A flow restriction device for a central lubricating system, comprising a conduit length, an elongated compact restricting steel wool filler, tightly retained within the bore thereof, and terminal connections for said conduit length.

16. A flow restriction device for a central lubricating system, comprising a conduit length, an elongated compact restricting wicking filler, means to retain said wicking tightly within the bore thereof, and terminal connections for said conduit length, said filler being of resistance so high that it will in itself determine the proportionate flow of the bearing to which it is connected.

17. A central lubricating distributing installation for a plurality of bearings comprising a source of liquid, a conduit system supplied therefrom having an inlet and having a plurality of outlet branches connected in multiple, each of said branches having a high resistance permeable flow obstructing filler retained therein, to permit substantial flow only under applied pressure and also to maintain the system substantially completely filled with lubricant, thereby substantially to prevent gravity flow through the system, each said filler being of resistance so high compared to the combined resistance of the rest of the conduit system and of the bearings that it will in itself substantially determine the proportionate rate of flow to the bearings substantially regardless of the diverse resistances of the rest of the conduit system and of the bearings.

18. A central lubricating installation for lubricating bearings, including a pipe line having an inlet closed against venting and having branches of flexible material with outlets feeding the bearings and connected in multiple, and high resistance permeable fillers in the bores of the respective branches, to permit substantial flow only under applied pressure and also to maintain the system substantially completely filled with lubricant, thereby substantially preventing gravity flow through the system, each filler being of flow obstructing effect adapted to the lubricant requirements of the corresponding bearing or bearings, each said filler being of resistance so high compared to the combined resistance of the pipe line and of the bearings that it will in itself substantially determine the proportionate rate of flow to the bearings substantially regardless of the diverse resistance of the pipe line and of the bearings.

19. A central lubricating installation for lubricating bearings, including a pipe line with an inlet and having branches, said branches being affixed near their outlet ends to the respective bearings and connected in multiple, a source of pressure connected to the inlet of the piping system, means closing said inlet against venting, and high resistance permeable flow restricting capillary filler members of substantial length within the bores of the respective branches, each of said members having a snug fit at a portion of the branch, and resisting flow of lubricant under applied pressure, and each said filler being of resistance so high compared to the combined resistance of the pipe line and of the bearings that it will in itself substantially determine the proportionate rate of flow to the bearings substantially regardless of the diverse resistances of the pipe line and of the bearings.

20. In a central lubricating installation for a mechanism of the type having a plurality of bearings including a central source of lubricant supply and pressure, a conduit system with an inlet from said source and branches, each branch having a flow metering unit thereon; each said flow metering unit comprising a resistance member tightly held within the corresponding branch and consisting of a porous capillary filler member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow; said filler member consisting of a compressible fibrous material, the inlet and outlet portions of said member being relatively little compressed and the central portion being relatively highly compressed.

21. In a central lubricating installation for a mechanism of the type having a plurality of bearings including a central source of lubricant supply and pressure, a conduit system with an inlet from said source and branches, each branch having a flow metering unit thereon; each said flow metering unit comprising a resistance member tightly held within the corresponding branch and consisting of a porous capillary filler member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow; said filler member consisting of a compressible fibrous material, the inlet portion of said member being relatively little compressed and a portion of said member removed from said inlet portion in the direction of flow being relatively highly compressed, whereby the flowing lubricant will encounter increasing resistance as it flows through the filler member toward the bearing.

22. In a central lubricating installation for a mechanism of the type having a plurality of bearings including a central source of lubricant supply and pressure, a conduit system with an inlet from said source and branches, each branch having a flow metering unit thereon; each said flow metering unit comprising a resistance member tightly held within the corresponding branch and consisting of a porous capillary filler member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow; said filler member consisting of an elongated plug of a compressible fibrous material, which material is substantially radially compressed.

23. In a central lubricating installation for a mechanism of the type having a plurality of bearings including a central source of lubricant supply and pressure, a conduit system with an inlet from said source and branches, each branch having a flow metering unit thereon; each said flow metering unit comprising a resistance member tightly held within the corresponding branch and consisting of a porous capillary filler member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow; a relatively dense filter being provided at said inlet between the source and the conduit system to remove dirt and solid particles from the lubricant before supply to the flow metering unit.

24. In a central lubricating installation for a mechanism of the type having a plurality of bearings including a central source of lubricant supply and pressure, a conduit system with an inlet from said source and branches, each branch having a flow metering unit thereon; each said flow metering unit comprising a resistance member tightly held within the corresponding branch and consisting of a porous capillary filler member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow.

Signed at New York in the county of New York and State of New York this 5th day of January A. D. 1929.

JOSEPH BIJUR.